US012794937B2

(12) United States Patent
Pane et al.

(10) Patent No.: US 12,794,937 B2
(45) **Date of Patent: *Nov. 10, 2026**

(54) ONLINE GAME NETWORK DEMULTIPLEXER WITH DENIAL-OF-SERVICE PREVENTION

(71) Applicant: Roblox Corporation, San Mateo, CA (US)

(72) Inventors: Brian Pane, San Francisco, CA (US); Ravi I. Singh, San Jose, CA (US); Lan Wei, San Mateo, CA (US); David Stahl, St. Louis, MO (US)

(73) Assignee: Roblox Corporation, San Mateo, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 18/794,535

(22) Filed: Aug. 5, 2024

(65) Prior Publication Data

US 2024/0396931 A1 Nov. 28, 2024

Related U.S. Application Data

(63) Continuation of application No. 17/704,767, filed on Mar. 25, 2022, now Pat. No. 12,081,585.

(51) Int. Cl.
*H04L 9/40* (2022.01)
*H04L 12/46* (2006.01)
(Continued)

(52) U.S. Cl.
CPC ...... *H04L 63/1458* (2013.01); *H04L 63/0435* (2013.01); *H04L 69/16* (2013.01);
(Continued)

(58) Field of Classification Search
CPC ............. H04L 63/0272; H04L 63/0435; H04L 63/1458; H04L 67/1001; H04L 67/1023; H04L 69/16; H04L 12/4641
See application file for complete search history.

(56) References Cited

U.S. PATENT DOCUMENTS 8,213,393 B2 * 7/2012 Suganthi ................ H04L 61/50 370/395.5
8,553,537 B2 * 10/2013 Chao ...................... H04L 12/66 370/230.1
(Continued)

FOREIGN PATENT DOCUMENTS

CN 103491053 1/2014

OTHER PUBLICATIONS

R. Fielding and J. Reschke. Hypertext Transfer Protocol (HTTP/1.1): Message Syntax and Routing (RFC 7230). (Year: 2014).*
(Continued)

*Primary Examiner* — John M Macilwinen
(74) *Attorney, Agent, or Firm* — IP Spring

(57) ABSTRACT

A processing application stored on a processing server receives a request to join an application server from a client device. The processing application identifies a targeted application server from a set of application servers, a private internet protocol (IP) address for the targeted application server, and a port number associated with the targeted application server. The processing application generates a token based at least in part on the private IP address for the targeted application server. The processing application maps the private IP address to a virtual IP (VIP) address. The processing application transmits the VIP address, the private IP address, the port number, and the token to the client device.

20 Claims, 5 Drawing Sheets

(51) Int. Cl.
*H04L 67/1001* (2022.01)
*H04L 67/1023* (2022.01)
*H04L 69/16* (2022.01)

(52) U.S. Cl.
CPC ...... *H04L 12/4641* (2013.01); *H04L 63/0272* (2013.01); *H04L 67/1001* (2022.05); *H04L 67/1023* (2013.01)

(56) References Cited

U.S. PATENT DOCUMENTS

| | | | | |
|---|---|---|---|---|
| 9,807,016 | B1 * | 10/2017 | Sarangapani | H04L 67/02 |
| 10,412,159 | B1 * | 9/2019 | McCullagh | H04L 67/1038 |
| 11,190,374 | B2 | 11/2021 | Shribman et al. | |
| 12,081,585 | B2 * | 9/2024 | Pane | H04L 69/16 |
| 2013/0170451 | A1 * | 7/2013 | Krause | H04W 72/542<br>370/329 |
| 2013/0173806 | A1 * | 7/2013 | Newton | H04L 67/1014<br>709/226 |
| 2014/0059168 | A1 | 2/2014 | Ponec et al. | |
| 2015/0350311 | A1 * | 12/2015 | Arai | H04L 63/10<br>709/203 |
| 2020/0328885 | A1 | 10/2020 | Tola et al. | |
| 2021/0084003 | A1 * | 3/2021 | Sharma | H04L 61/5007 |
| 2022/0029973 | A1 * | 1/2022 | Carney | H04L 61/5007 |

OTHER PUBLICATIONS

Olteanu, Vladimir, et al. “Stateless datacenter load-balancing with beamer.” 15th USENIX Symposium on Networked Systems Design and Implementation (NSDI 18). (Year: 2018).*
Pei, Chao, et al. English translation of CN_103491053_A_I. (Year: 2014).*
Olteanu, et al., “Stateless datacenter load-balancing with beamer”, 15th USENIX Symposium on Networked Systems Design and Implementation (NSDI 18), 2018, 15 pages.
USPTO, International Search Report for International Patent Application No. PCT/US2023/015793, Jun. 27, 2023, 2 pages.
USPTO, Written Submission for International Patent Application No. PCT/US2023/015793, Jun. 27, 2023, 4 pages.
USPTO, Notice of Allowance for U.S. Appl. No. 17/704,767, May 1, 2024, 11 pages.
Williams, et al., “GitHub Load Balancer Director”, Retrieved from Internet: https://github.com/github/glb-director, 2020, 5 pages.

* cited by examiner

ONLINE GAME NETWORK DEMULTIPLEXER WITH DENIAL-OF-SERVICE PREVENTION

CROSS-REFERENCE TO RELATED PATENT APPLICATIONS

The present application is a continuation of U.S. patent application Ser. No. 17/704,767, filed Mar. 25, 2022 and titled ONLINE GAME NETWORK DEMULTIPLEXER WITH DENIAL-OF-SERVICE PREVENTION, the entire contents of which are hereby incorporated by reference herein.

BACKGROUND

Embodiments relate generally to an online game network demultiplexer that prevents denial-of-service attacked.

Some online platforms (e.g., gaming platforms, media exchange platforms, etc.), allow users to connect with each other, interact with each other (e.g., within a game), create games, and share information with each other via the Internet. Users of online platforms may participate in multiplayer gaming environments or virtual environments (e.g., three-dimensional environments), design custom gaming environments, design characters and avatars, decorate avatars, exchange virtual items/objects with other users, communicate with other users using audio or text messaging, and so forth. Environments such as metaverse or multiverse environments can also enable users that participate to share, sell, or trade objects of their creation with other users.

Online multiplayer games typically depend on network communication between client devices and a central server. Game operators typically run many servers for scale, with client devices partitioned among those servers. The client-to-server communication typically uses a user datagram protocol (UDP)-based application protocol. A UDP-based application protocol results in two problems. First, giving each server a unique, public internet protocol (IP) address is an inefficient use of public IP address space, especially when IPv4 address space is such a scarce resource. Second, internet-facing servers are vulnerable to Denial of Service (DOS) attacks.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments of this application relate to using a demultiplexer to route ingress packets to a targeted application server. According to one aspect, a computer-implemented method performed at a processing server comprises: receiving a request to join an application server from a client device. The method further comprises identifying a targeted application server from a set of application servers, a private internet protocol (IP) address for the targeted application server, and a port number associated with the targeted application server. The method further comprises generating a token based at least in part on the private IP address for the targeted application server. The method further comprises mapping the private IP address to a virtual IP (VIP) address. The method further comprises transmitting the VIP address, the private IP address, the port number, and the token to the client device.

In some embodiments, the token is a hash of a client device IP address of the client device, the private IP address, and a secret key, and wherein the secret key is stored at the processing server. In some embodiments, the secret key is selected from a set of secret keys that are updated periodically. In some embodiments, the method further comprises receiving, from the client device, an ingress packet at a demultiplexer that corresponds to the VIP address, wherein the ingress packet includes a routing and authentication header, parsing the routing and authentication header to obtain the private IP address, the port number, and the token, determining, using a secret key, whether the token is valid, and responsive to determining that the token is valid, forwarding the ingress packet to the targeted application server. In some embodiments, the processing server is one of a plurality of processing servers mapped to the VIP address, the ingress packet is received by a first processing server that is different from a second processing server that received the request to join, and the first processing server determines that the token is valid using information from the ingress packet and the secret key. In some embodiments, determining whether the token is valid includes comparing the token to a hash of a client device IP address, the private IP address, and the secret key to confirm that both values are equal. In some embodiments, forwarding the ingress packet to the targeted application server includes using a tunnel to forward the ingress packet by generating an encapsulated packet. In some embodiments, the method further includes responsive to determining that the token is invalid, performing one or more of dropping future ingress packets from the client device or automatically blocking the client device IP address. In some embodiments, wherein receiving the request to join and transmitting the token are over hypertext transfer protocol (HTTP) and wherein receiving the ingress packet at the VIP address occurs over UDP. In some embodiments, the demultiplexer steers the ingress packet to a specific Point of Presence (PoP) that hosts the targeted application server. In some embodiments, the token is a first token and the method further includes: generating a second token using a second secret key, wherein generating the second token is performed after at least a predetermined amount of time has passed from generating the token, where generating the second token invalidates the first token. In some embodiments, the processing server is one of a plurality of processing servers mapped to the VIP address, incoming packets are sharded among the plurality of processing servers, and each of the plurality of processing servers receives a secret key that is used for authentication of the token. In some embodiments, identifying the targeted application server from the set of application servers is based on a client device IP address of the client device and selecting the targeted application server that is closest to a location of the client device as compared to other application servers in the set of application servers. In some embodiments, the token is a hash of a client device IP address of the client device, the private IP address, and a secret key and the processing server receives a randomly selected value and generates the secret key from the randomly selected value.

A system may include a processor and a memory coupled to the processor, with instructions stored thereon that, when executed by the processor, cause the processor to perform operations comprising: receiving a request to join an application server from a client device; identifying a targeted application server from a set of application servers, a private internet protocol (IP) address for the targeted application server, and a port number associated with the targeted application server; generating a token based on the private IP address for the targeted application server; mapping the private IP address to a VIP address; and transmitting the VIP address, the private IP address, the port number, and the token to the client device.

Embodiments may further include a non-transitory computer readable medium that includes instructions stored thereon that, when executed by one or more computers, cause the one or more computers to perform operations comprising: receiving a request to join an application server from a client device; identifying a targeted application server from a set of application servers, a private internet protocol (IP) address for the targeted application server, and a port number associated with the targeted application server; generating a token based on the private IP address for the targeted application server; mapping the private IP address to a VIP address; and transmitting the VIP address, the private IP address, the port number, and the token to the client device.

In some embodiments, the token is a hash of a client device IP address of the client device, the private IP address, and a secret key, and wherein the secret key is stored at the processing server. In some embodiments, the secret key is selected from a set of secret keys that are updated periodically. In some embodiments, the operations further include: receiving, from the client device, an ingress packet at a demultiplexer that corresponds to the VIP address, wherein the ingress packet includes a routing and authentication header, parsing the routing and authentication header to obtain the private IP address, the port number, and the token, determining, using a secret key, whether the token is valid, and responsive to determining that the token is valid, forwarding the ingress packet to the targeted application server.

The specification advantageously uses a demultiplexer that runs in front of a pool of game servers and provides access to the game servers via a single, VIP address. As a result, the system is able to avoid distributed denial of service (DDOS) attacks. In addition, a secret key is used as part of an authentication process, which avoids the need for encryption/decryption algorithms to run on the client device. As a result, client devices with lower-processing power, such as low-end tablets are able to play games that are normally reserved for client devices with more processing power. In addition, because the token is provided to the client device, which relays the token to the demultiplexer for authentication, the client device does not have to spend processing power on computing the token.

DETAILED DESCRIPTION

Network Environment 100

Figure 1:
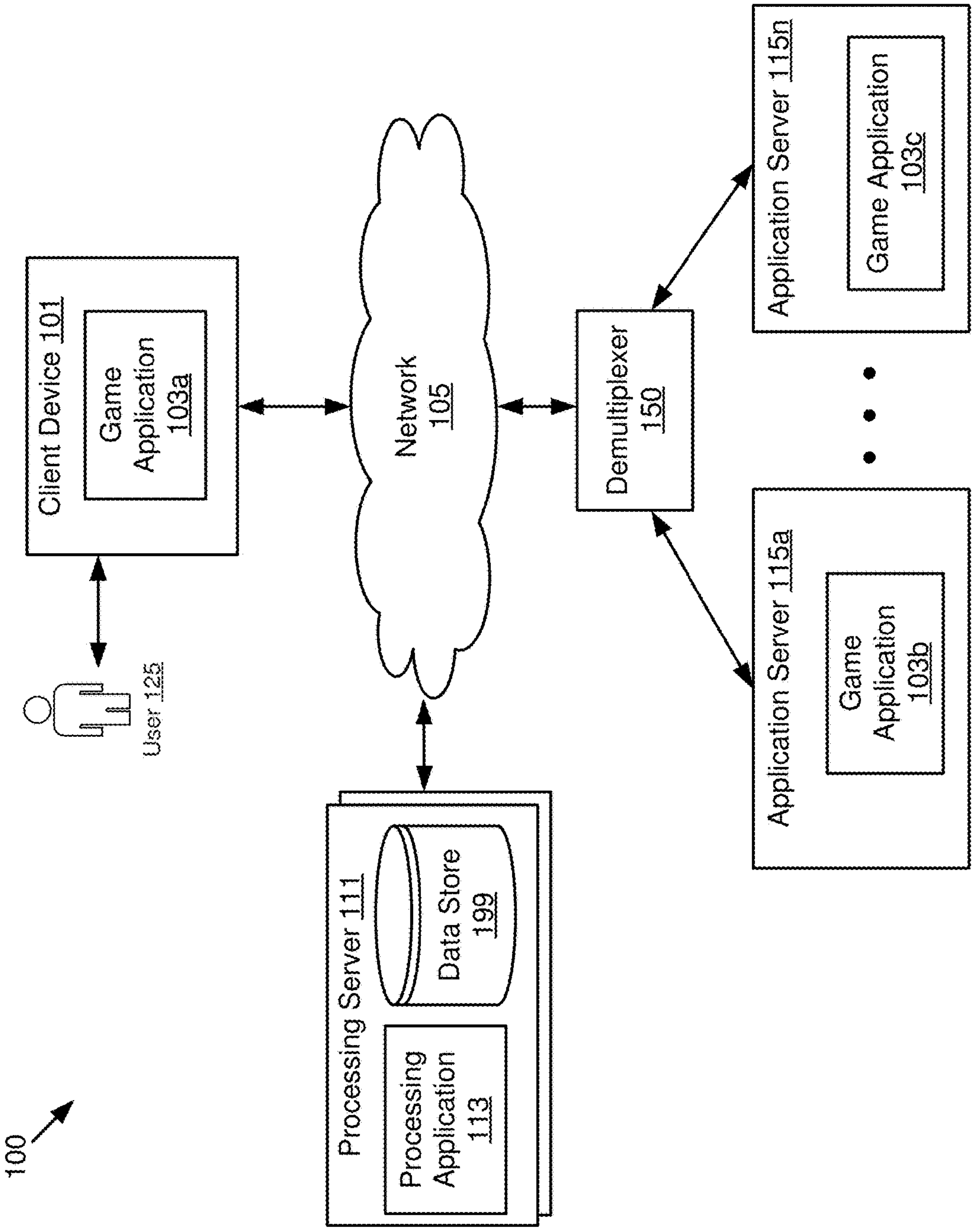
FIG. 1 is a block diagram of an example network environment, according to some embodiments described herein.

FIG. 1 illustrates a block diagram of an example environment 100. In some embodiments, the environment 100 includes a client device 101, one or more processing servers 111, a demultiplexer, application servers 115*a* . . . *n*, and a network 105. A user 125 may be associated with the client device 101. In some embodiments, the environment 100 may include other servers or devices not shown in FIG. 1. In FIG. 1 and the remaining figures, a letter after a reference number, e.g., "115*a*," represents a reference to the element having that particular reference number. A reference number in the text without a following letter, e.g., "115," represents a general reference to embodiments of the element bearing that reference number.

The client device 101 may be a computing device that includes a memory and a hardware processor. For example, the client device 101 may include a desktop computer, a mobile device, a tablet computer, a mobile telephone, a wearable device, a portable game player, a portable music player, a reader device, or another electronic device capable of accessing a network 105.

In some embodiments, the client device 101 includes a game application 103*a* with code and routines operable to send a request to the processing server 111 to join a game. Although the game application 103*a* is described as an application, other instantiations are possible, such as a browser version. The game application 103*a* may receive a virtual internet protocol (VIP) address, a port number associated with an application server 115*a*, and a token from the processing server 111.

The game application 103*a* generates an ingress packet. In some embodiments, the ingress packet includes a routing and authentication header with the token received from the processing server 111. The client device 101 transmits the ingress packet to the VIP address provided by the processing server 111. Once the processing server 111 authenticates the ingress packet, the game application 103*a* may receive an egress packet directly from the application server 115.

The ingress packet is received at the VIP address that is mapped to the demultiplexer 150. The demultiplexer 150 processes the ingress packet, authenticates a token that is part of the ingress packet, and responsive to the token being valid, forwards the information in the ingress packet to one of the application servers 115 via the network 105.

The processing server 111 includes one or more servers that each include a processor, a memory, and network communication hardware. In some embodiments, the processing server 111 is a hardware server. The processing server 111 is communicatively coupled to the network 105. In some embodiments, the processing server 111 sends and receives data to and from the client device 101 and the applications servers 115*a* . . . *n* via the network 105. The processing server 111 may include a processing application 113 and a database 199.

In some embodiments, processing application 113 includes code and routines operable to receive a request to join the application server 115 from the client device 101. The processing application 113 identifies a targeted application server 115, such as application server 115*a*, and requests a token for a private IP address with a port number associated with the targeted application server 115*a*. The processing application 113 maps the private IP address to a VIP address and generates a token that is based on the private IP address and the VIP address. The processing application 113 transmits the VIP address, the port number, and the token to the client device 101.

In some embodiments, the processing application 113 is implemented using hardware including a central processing unit (CPU), a field-programmable gate array (FPGA), an application-specific integrated circuit (ASIC), any other type of processor, or a combination thereof. In some embodiments, the processing application 113 is implemented using a combination of hardware and software.

The data store 199 may be a non-transitory computer readable memory (e.g., random access memory), a cache, a drive (e.g., a hard drive), a flash drive, a database system, or another type of component or device capable of storing data. The data store 199 may also include multiple storage components (e.g., multiple drives or multiple databases) that may also span multiple computing devices (e.g., multiple server computers). The data store 199 may store data associated with the processing application 113, such as tokens, secret keys, pre-secret keys, private IP addresses, port numbers, VIP addresses, etc.

While FIG. 1 illustrates one client device 101, the disclosure applies to a system architecture having one or more client devices 101.

In the illustrated embodiment, the entities of the environment 100 are communicatively coupled via a network 105. The network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof. Although FIG. 1 illustrates one network 105 coupled to the client device 101, the processing server 111, and the application servers 115, in practice one or more networks 105 may be coupled to these entities.

Computing Device Example 200

Figure 2:
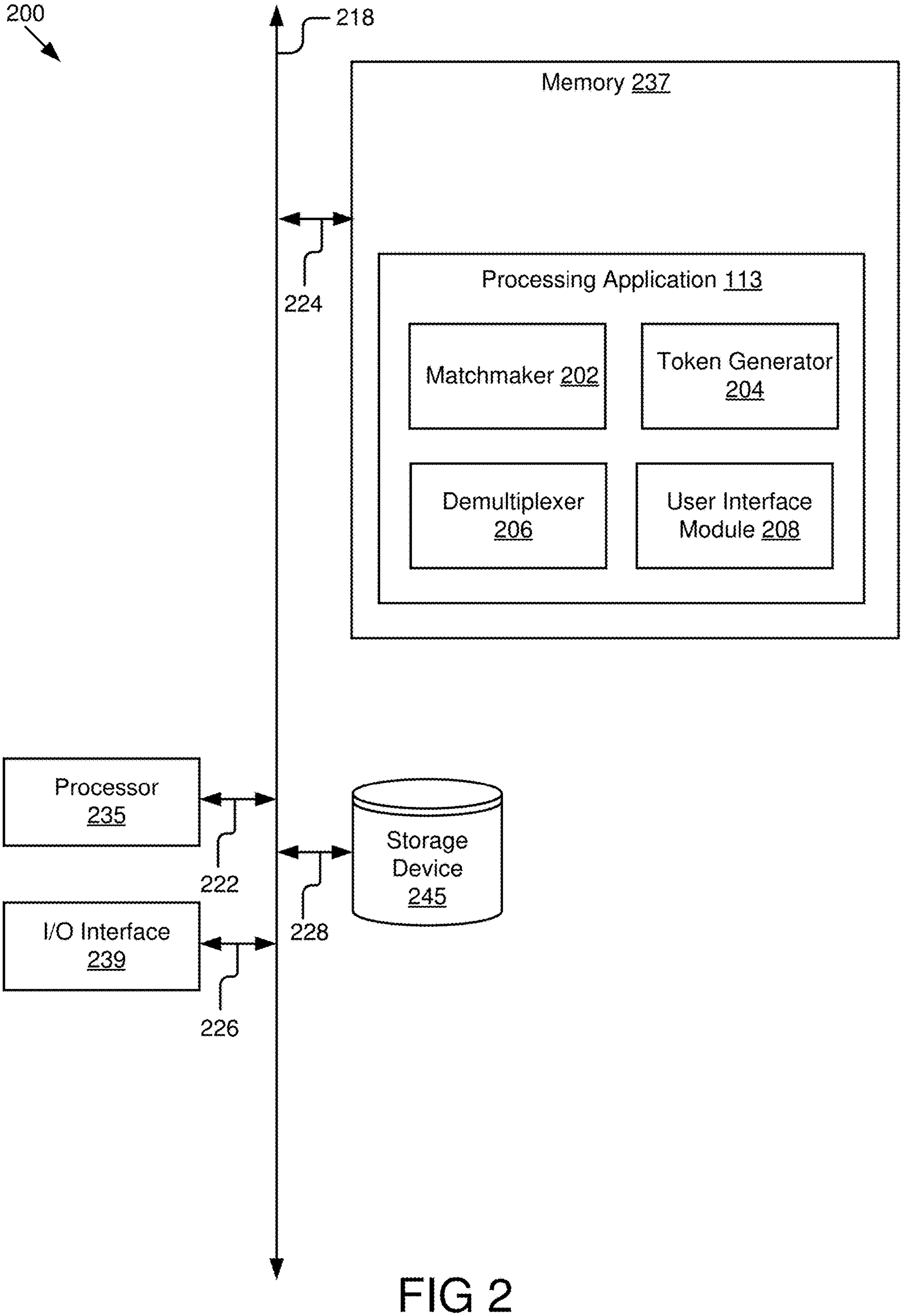
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is the processing server 111.

In some embodiments, computing device 200 includes a processor 235, a memory 237, a I/O interface 239, and a storage device 245. The processor 235 may be coupled to a bus 218 via signal line 222, the memory 237 may be coupled to the bus 218 via signal line 224, the I/O interface 239 may be coupled to the bus 218 via signal line 226, and the storage device 245 may be coupled to the bus 218 via signal line 228.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200. The processor 235 is coupled to the bus 220 for communication with the other components via signal line 222.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the video application 103, which is described in greater detail below. The memory 237 is coupled to the bus 220 for communication with the other components via signal line 224.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 245), and input/output devices can communicate via I/O interface 239. In another example, the I/O interface 239 can receive data from the client device 101 and deliver the data to the processing application 113 and components of the processing application 113, such as the matchmaker 202. In some embodiments, the I/O interface 239 can connect to interface devices such as input devices (keyboard, pointing device, touchscreen, microphone, camera, scanner, sensors, etc.) and/or output devices (display devices, speaker devices, printers, monitors, etc.). The I/O interface 239 is coupled to the bus 220 for communication with the other components via signal line 226.

The storage device 245 stores data related to the processing application 113. For example, the storage device 245 may store tokens, secret keys, pre-secret keys, private IP addresses, port numbers, VIP addresses, etc. In embodiments where the processing application 113 is part of the processing server 111, the storage device 245 is the same as the database 199 in FIG. 1.

Example Processing Application 113

FIG. 2 illustrates a computing device 200 that executes an example processing application 113 that includes a matchmaker 202, a token generator 204, a demultiplexer 206, and a user interface module 208. Although the modules are illustrated as being part of the same processing application 113, persons of ordinary skill in the art will recognize that the modules may be implemented by different processing servers 111 and demultiplexers 150 in any combination. For example, a first processing server 111*a* may include the matchmaker 202 and the token generator 204 and a demultiplexer 206 may be part of a standalone second processing server 111*b*.

The matchmaker 202 identifies an application server 115 and provides information to the client device 101. In some embodiments, the matchmaker 202 includes a set of instructions executable by the processor 235 to identify the application server 115 and provide information to the client device 101. In some embodiments, the matchmaker 202 is stored in the memory 237 of the computing device 200 and can be accessible and executable by the processor 235.

In some embodiments, the matchmaker 202 receives a request to join an application server 115 from a client device 101. The matchmaker 202 identifies a targeted application server 115*a* from a set of application servers 115*a* . . . *n*. For example, the matchmaker 202 may assign the client device 101 to the targeted application server 115*a* to balance load on various application servers 115 and/or other components, based on a network proximity between the client device 101 and various available application servers 115, and/or other factors. For example, the matchmaker 202 may identify the targeted application server 115*a* from the set of application servers based on a client device IP address of the client device 101 and select the targeted application server 115*a* that is closest to a location of the client device 101 as compared to other application servers 115 in the set of application servers 115. The matchmaker 202 may determine the private IP address and the port number of the targeted application server 115*a*.

The matchmaker 202 may assign multiple demultiplexer 206 to handle the communications with the client device 101. For example, the matchmaker 202 may map the private IP address to a virtual IP (VIP) address for one or more demultiplexers 206 that listen to the same VIP address.

In some embodiments, the matchmaker 202 requests a token from the token generator 204. This process is described in greater detail below with reference to the token generator 204. In some embodiments, the matchmaker 202 provides the VIP address, the private IP address, the port number, and the token to the client device 101 via the I/O interface 239.

In some embodiments, the communication between the client device 101 and the matchmaker 202 occur over hypertext transfer protocol (HTTP) or secure HTTP (HTTPS).

The token generator 204 generates a token. In some embodiments, the token generator 204 includes a set of instructions executable by the processor 235 to generate the token. In some embodiments, the token generator 204 is stored in the memory 237 of the computing device 200 and can be accessible and executable by the processor 235.

In some embodiments, the matchmaker 202 requests a token from the token generator 204. The request may include a private IP address and a port number for the targeted application server 115*a* that is assigned to the client device 101. The token generator 204 may use a cryptographic hash function that is a cryptographic Message Authentication Code (MAC) where the token is derived from connection information, time (e.g., a timestamp), and platform-defined metadata. The token serves to provide a limited amount of platform-defined metadata for token versioning and platform-defined purposes.

In some embodiments, the token generator 204 generates a token by hashing an IP address of the client device 101, the private IP address of the targeted application server 115*a*, and a secret key. In other embodiments, the token generator 204 generates a token by hashing the VIP address, the IP address of the client device 101, the private IP address of the targeted application server 115*a*, and the secret key. In some embodiments, the token generator 204 uses a hash-based message authentication code (HMAC) algorithm to generate the token.

The secret key may be selected from a set of secret keys that are updated periodically. For example, the secret key may be updated periodically. Each secret key may be valid for a short period of time, for example, 10 seconds. The secret key is updated to a new value at the expiration of its validity period. In some embodiments, the secret key may be selected from a set of keys (e.g., 1000 keys) that are rotated. In some embodiments, a new secret key may be generated at the end of each validity period. In some embodiments, the tunable window may be modified based on different factors, such as when the token generator 204 is overloaded but not experiencing bad client devices 101 (e.g., a DOS attack) to increase a length that the secret key is valid or when the processing server 111 is experiencing a DOS attack to decrease a length that the secret key is valid.

The token generator 204 may update the secret key frequently (e.g., every second, every few seconds, every millisecond, etc.) to guard against replay attacks. In some embodiments, because a large number of processing servers 111 receive updates to the secret key values, the token generator 204 uses a two-stage generation process where the token generator 204 distributes a pre-pepper (e.g., a randomly selected value) to all demultiplexers 206 and application servers 115, and each of the demultiplexers 206 and application servers 115 generate successive secret keys or use the pre-pepper to validate a secret key. In embodiments where the demultiplexers 206 and/or the applications servers 115 generate the successive secret keys, the generation may be based on the pre-pepper using a deterministic process such that each demultiplexer 206 and/or application servers 115 generate identical secret keys from identical inputs.

In some embodiments, each generation of a secret key from a pre-pepper marks a time interval for effective use of the secret key based on a timestamp. In some embodiments, each application server 115 actively requests a pre-pepper from the token generator 204 to support fast rotation of pre-peppers. In some embodiments, the token generator 204 rotates the pre-peppers based on selective parameters and administrator input. By using a token generator 204 as a central node to distribute pre-peppers, the technology advantageously ensures that the secret key is hidden from other components of the network environment 100.

In some embodiments, the token is valid for a predetermined amount of time. For example, the token generator 204 generates a first token and after a predetermined amount of time, generates a second token. The second token uses a different secret key. In some embodiments, generation of the second token invalidates the first token after another predetermined amount of time.

In some embodiments, the token generator 204 transmits the following information to the matchmaker 202, which relays the information to the client device 101 via the I/O interface 239: a virtual IP (VIP) address for the demultiplexer 206, the private IP address and the port number for the targeted application server 115*a*, and the token. In other embodiments, the information is transmitted directly to the client device 101 via the I/O interface 239.

The demultiplexer 206 provides client devices 101 with access to the application servers 115 via the VIP address. In some embodiments, the demultiplexer 206 includes a set of instructions executable by the processor 235 to provide access to the application servers 115. In some embodiments, the demultiplexer 206 is stored in the memory 237 of the computing device 200 and can be accessible and executable by the processor 235.

The demultiplexer 206 receives the secret key from the token generator 204. In some embodiments, the demultiplexer 206 receives ingress packets from the client device 101. Each ingress packet may include an extensible custom application-layer header, a routing and authentication header, and a message. The routing and authentication header includes the private IP address and the port number for the targeted application server 115*a*, as well as the token.

The header may be extensible to enable additional demultiplexer functionality in the future.

Upon receipt of an ingress packet, the demultiplexer 206 checks the routing and authentication header. If the ingress packet is lacking the routing and authentication header or the routing and authentication head is malformed, the demultiplexer 206 discards the ingress packet. If the routing and authentication header is present and not malformed, the demultiplexer 206 parses the routing and authentication layer to extract the private IP address and the port number for the targeted application server 115*a*, as well as the token. The demultiplexer 206 performs authentication of the token. For example, the demultiplexer 206 may identify the secret key; generate a hash of the client device IP address, the private IP address, and a secret key; and compare the hash to the token to confirm that the values are equal.

If the demultiplexer 206 determines that the token is invalid, the demultiplexer 206 may drop the ingress packet. This protects the system from a distributed DoS (DDOS) attack. In some embodiments, the demultiplexer 206 may drop future ingress packets from the same client device 101 or automatically block the client device 101 IP address. For example, the demultiplexer 206 may stream data about attributes of the ingress packets that fail token validation, resulting in the demultiplexer 206 using a list of client devices 101 that are given persistent-drop treatment. In some embodiments, the demultiplexer 206 sends a notification to the client device 101 that the ingress packet is invalid.

If the demultiplexer 206 determines that the token is valid, the demultiplexer 206 may identify the targeted application server 115*a* using the private IP address and the port number and forward the ingress packet to the targeted application server 115*a*. In some embodiments, the demultiplexer 206 encapsulates the ingress packet and forwards an egress packet to the targeted application server 115*a* by using a tunnel. More specifically, the demultiplexer 206 may encapsulate the ingress packet in a tunnel header of type generic user datagram protocol (UDP) encapsulation (GUE) header. The egress packet may include an extensible custom application-layer header, a GUE header, and the message. In some embodiments, receiving the ingress packet at the VIP address and transmitting the egress packet to the targeted application server 115*a* occur using UDP.

In some embodiments, once the targeted application server 115*a* receives the egress packet, the targeted application server 115*a* communicates directly with the client device 101 without the demultiplexer 206 serving as an intermediary.

Figure 3:
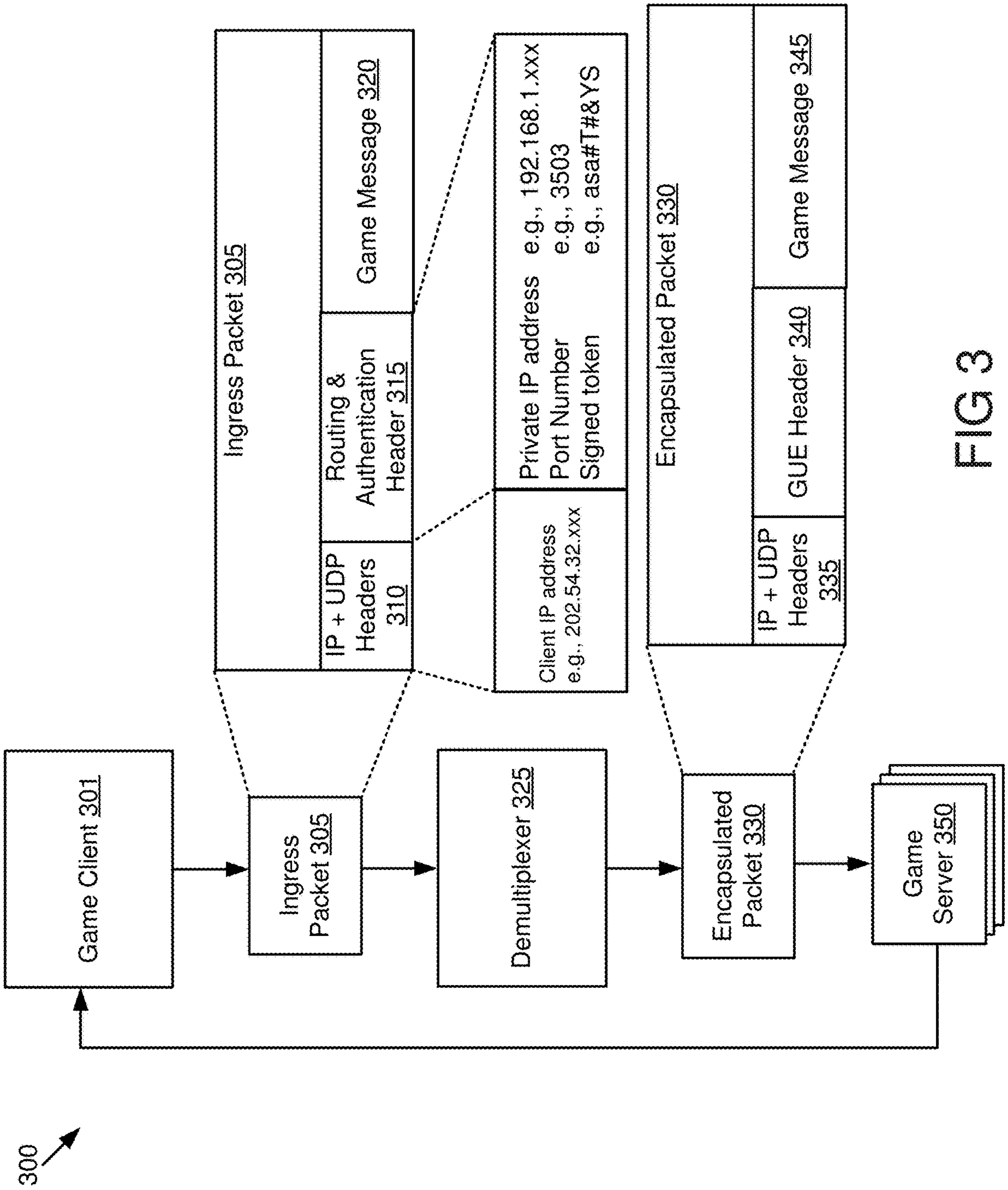
FIG. 3 is an example flow diagram between a game client and a game server, according to some embodiments described herein.

Turning to FIG. 3, an example use case 300 between a game client and a game server is illustrated. Although the example use case 300 is for a game client and a game server, persons of ordinary skill in the art will recognize that this process could apply to any situation where a client device is trying to access one of many application servers and a demultiplexer serves as an intermediary to prevent the risk of DDOS attacks.

In this example, a game client 301 generates an ingress packet 305 and transmits the ingress packet 305 to the demultiplexer. The ingress packet 305 may include IP+UDP headers 310, a routing and authentication header 315, and a game message 320. The IP+UDP headers 310 include a client IP address. The routing and authentication header 315 includes a private IP address for the targeted application server 115, a port number, and a signed token. In some implementations, game message 320 may be a Raknet based message. While RakNet is one UDP-based application protocol that may be used, other UDP-based non-Raknet applications can also be similarly used.

The demultiplexer 325 receives the ingress packet 305, parses the routing and authentication header 315 for the IP address, the port number, and the token. The demultiplexer 325 authenticates the token and, if the token is valid, generates an encapsulated packet 330 from the ingress packet 305. The encapsulated packet 330 includes IP+UDP headers 335, a GUE header 340, and the game message 345. The demultiplexer 325 transmits the encapsulated packet 330 to the game server 350. The game server 350 then directly communicates with the game client 301.

In some embodiments, the demultiplexer 325 is part of a processing server 111 that is one of multiple processing servers 111 mapped to the same VIP address. The network 105 may shard the incoming packets among the multiple processing servers as part of a horizontally scaled setup. In some embodiments, the network 105 uses the common routing protocol Border Gateway Protocol (BGP) with Equal Cost Multi Path (ECMP) hashing (or other suitable techniques) to shard the ingress packets evenly among the processing servers 111. The ingress packets are divided without the need for synchronizing per-flow state between the multiple demultiplexers 206 that are part of the horizontally scaled setup.

In some embodiments, each demultiplexer 325 in the multiple processing servers 111 receives the secret key and uses it to authenticate the token. As a result, the processing server 111 that processed an initial request and generated the secret key is not the only processing server 111 capable of performing authentication. Any of the processing servers 111 are capable of performing authentication using the secret key and the ingress packet transmitted by the client device 101.

One advantage of the demultiplexer 325 is that its stateless nature allows game traffic from client devices 101 to arrive at any of the Point of Presence (POP) edge data centers and the game traffic will be forwarded to the correct application server 115 in whichever POP is located in the network 105. As a result, the VIPs can be successfully used in a global anycast fashion.

The use of the VIP address along with the stateless nature of the demultiplexer 206 enabled by the routing and authentication header provides another attractive property: namely the ability to steer traffic on a per-user basis to a specific ingress POP—an edge data center that hosts application servers 115 in the global network 105. Internet routing on parts of the internet owned by other network providers, including where the client device 101 may be connected, might otherwise have caused traffic from the specific client device 101 to ingress into the network 105 at a different POP to reach the same application server 115. Instead, this steering to specific PoPs might be done to provide a better network experience, for example, because a specific application server 115 may be selected for lower latency or lower network congestion to specific client devices 101 by various techniques including backhauling over the network 105 to the specific POP where the application server 115 is located.

The use of the VIP address with the demultiplexer 206 enables global IPv4 address space conservation in that the application servers 115 do not themselves need to have a per-application server 115 global IPv4 address and can just be numbered with RFC1918 private addresses on their network interface. An entire PoP of application servers 115 could thus be abstracted behind a single per-POP VIP address. Alternatively, there may be multiple VIP addresses in use on a horizontally-scaled demultiplexer 206 pool to enable partitioning of the traffic for network management or for capacity planning.

The user interface module 208 generates a user interface. In some embodiments, the user interface module 208 includes a set of instructions executable by the processor 235 to generate the user interface. In some embodiments, the user interface module 208 is stored in the memory 237 of the computing device 200 and can be accessible and executable by the processor 235.

In some embodiments, the user interface module 208 generates a user interface that an administrator can use to modify settings of the processing application 113. For example, the user interface may include an option for configuring how often the secret key is rotated, a list of client IP addresses that are blocked because the client device 101 failed authentication a predetermined number of times, etc.

Example Methods

Figure 4:
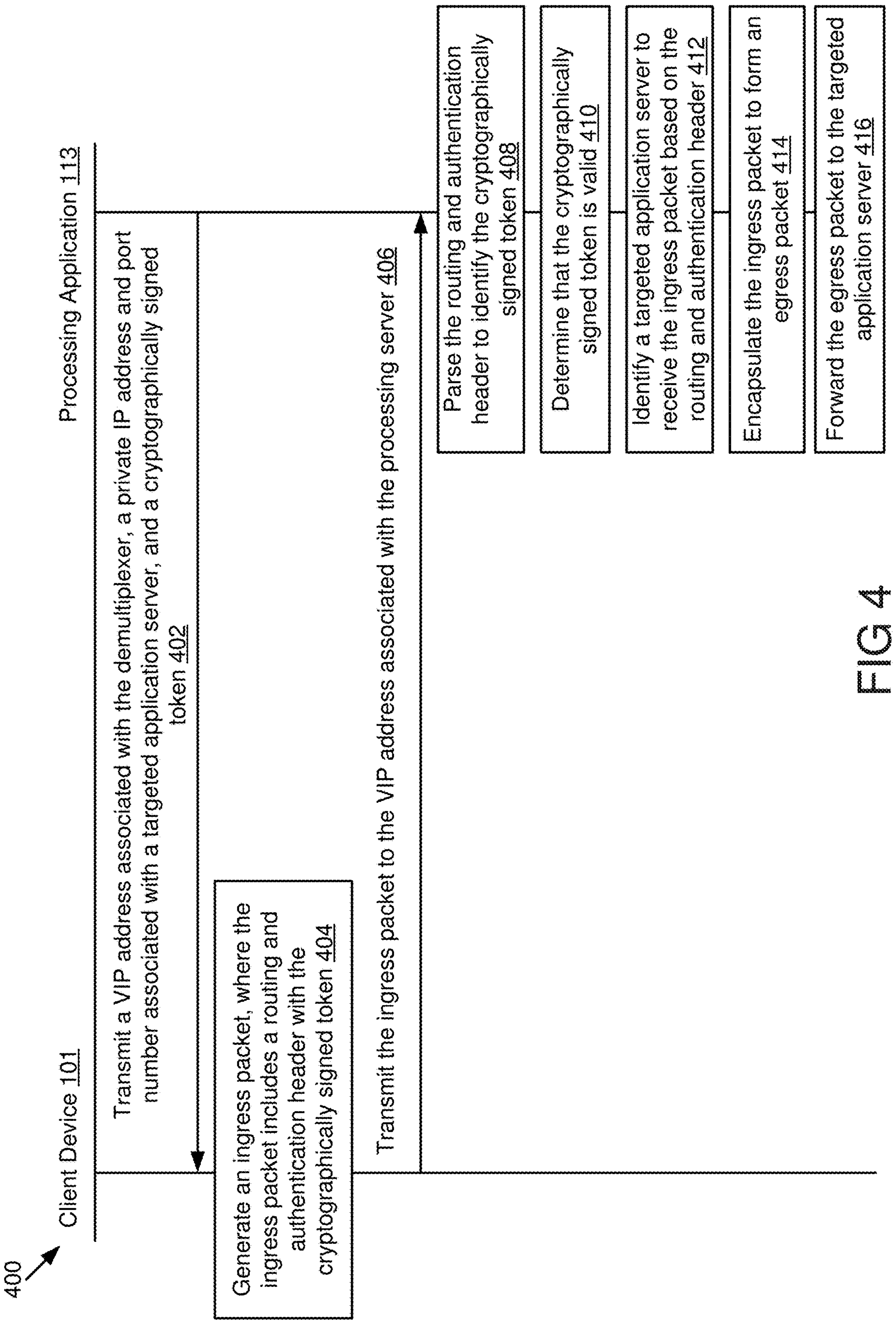
FIG. 4 is an example flow diagram between a client device and a processing application, according to some embodiments.

FIG. 4 is an example flow diagram between a client device 101 and a processing application 113, according to some embodiments. In this embodiment, the processing application 113 includes the demultiplexer 206, but the demultiplexer 206 may be part of a separate server than the other components of the processing application 113, such as the configuration illustrated in FIG. 1. The method illustrated in flowchart 400 is performed by both a client device 101 and a processing application 113 stored on a processing application 113.

The method 400 may begin at block 402. At block 402, the processing server 113 (e.g., the matchmaker 202) transmits a VIP address associated with the demultiplexer 206, a private IP address and port number associated with a targeted application server 115*a*, and a token to the client device 101. Block 402 may be followed by block 404.

At block 404, the client device 101 generates an ingress packet, where the ingress packet includes a routing and authentication header with the token. Block 404 may be followed by block 406.

At block 406, the client device 101 transmits the ingress packet to the VIP address associated with the processing server 111. Block 406 may be followed by block 408.

At block 408, the processing application 113 (e.g., the demultiplexer 206) parses the routing and authentication header to identify the token. Block 408 may be followed by block 410. At block 410, the processing application 113 determines that the token is valid. Block 410 may be followed by block 412. At block 412, the processing application 113 may identify a targeted application server 115*a* to receive the ingress packet based on the routing and authentication header. Block 412 may be followed by block 414. At block 414, the processing application 113 encapsulates the ingress packet to form an egress packet. Block 414 may be followed by block 416. At block 416, the processing server 111 forwards the egress packet to the targeted application server 115*a*.

Figure 5:
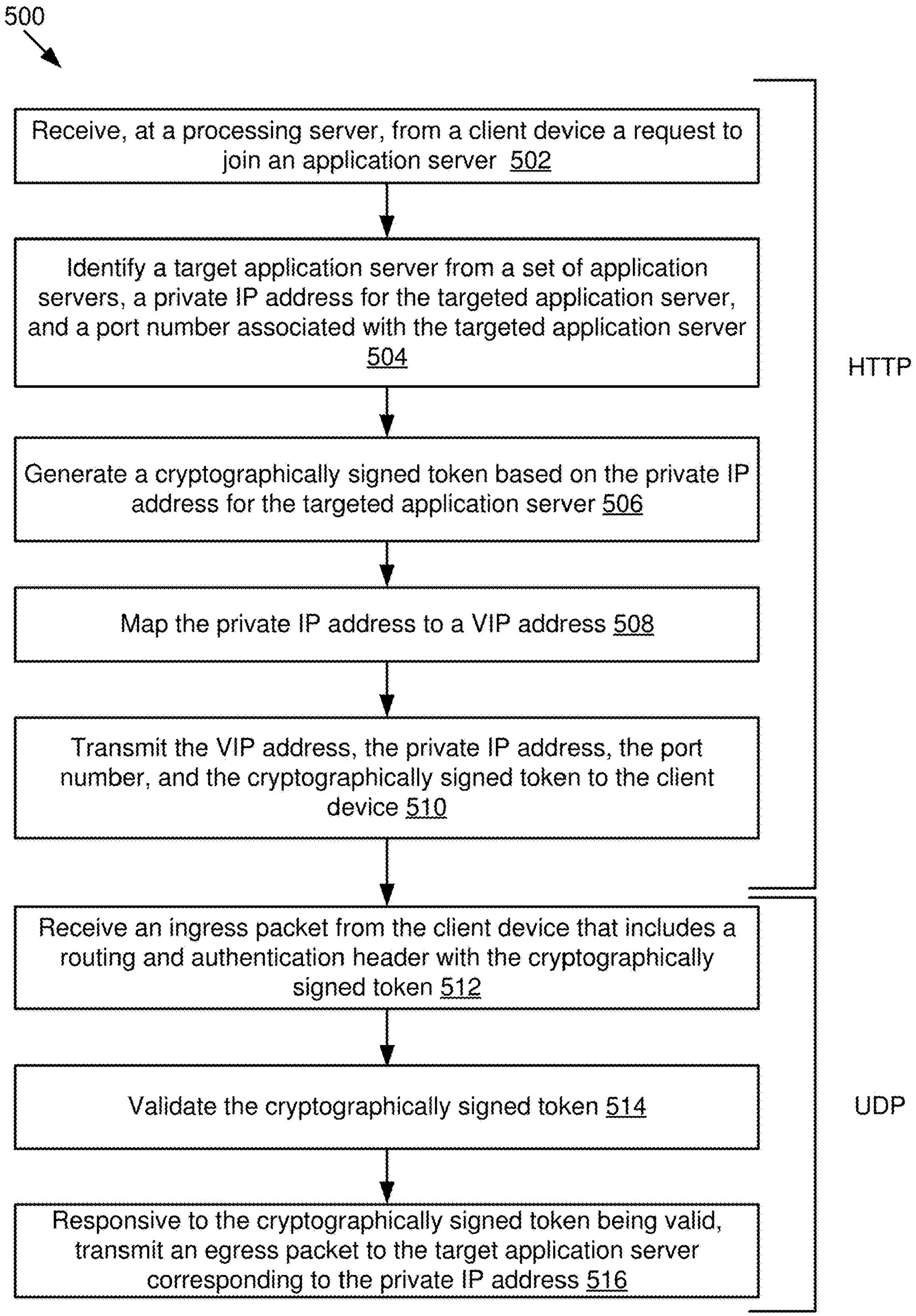
FIG. 5 is an example flow diagram written from the processing server perspective, according to some embodiments described therein.

FIG. 5 is an example flow diagram written from the processing server 111 perspective, according to some embodiments described therein. The method illustrated in flowchart 500 may be performed by the computing device 200 in FIG. 2.

The method 500 may begin at block 502. At block 502, a processing server 111 receives from a client device a request to join an application server 115. Block 502 may be followed by block 504.

At block 504, a target application server 115*a* is identified from a set of application servers 115, a private IP address for the targeted application server 115, and a port number associated with the targeted application server 115. Block 504 may be followed by block 506.

At block 506, a token is generated based on the private IP address for the targeted application server 115. Block 506 may be followed by block 508.

At block 508, the private IP address is mapped to a VIP address. Block 508 may be followed by block 510.

At block 510, the VIP address, the private IP address, the port number, and the token are transmitted to the client device 101. In some embodiments, blocks 502-510 are performed over HTTP at the application server 111. Block 510 may be followed by 512.

At block 512, an ingress packet is received from the client device that includes a routing and authentication header with the token. Block 512 may be followed by block 514.

At block 514, the token is validated. Block 514 may be followed by block 516.

At block 516, responsive to the token being valid, an egress packet is transmitted to the target application server 115*a* corresponding to the private IP address. In some embodiments, blocks 512-516 are performed over UDP at the demultiplexer 150.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method performed at a client device, the method comprising:
- transmitting a request to a processing server to join a targeted application server;
- receiving a virtual internet protocol (VIP) address associated with a demultiplexer, a private IP address for the targeted application server, a port number, and a token from the processing server;
- generating an ingress packet, wherein the ingress packet includes a routing and authentication header that includes the token and a message; and
- transmitting the ingress packet to the VIP address associated with the demultiplexer based on the port number.

2. The method of claim 1, wherein the demultiplexer authenticates the token and responsive to the token being valid, generates an encapsulated packet from the ingress packet that enables the targeted application server to communicate directly with the client device.

3. The method of claim 2, further comprising:
- responsive to the demultiplexer confirming that the token is valid, receiving communications at the client device directly from the targeted application server.

4. The method of claim 1, wherein the demultiplexer authenticates the token, the method further comprising:
- responsive to the demultiplexer determining that the token is invalid, receiving a notification from the demultiplexer that the token is invalid.

5. The method of claim 1, wherein the ingress packet includes an extensible custom application-layer header.

6. The method of claim 1, wherein the token is generated from a hash of an IP address for the client device, the private IP address for the targeted application server, and a secret key.

7. The method of claim 1, wherein the ingress packet includes a user datagram protocol (UDP) header.

8. A client device comprising:
- a processor; and
- a memory coupled to the processor, with instructions stored thereon that, when executed by the processor, cause the processor to perform operations comprising:
  - transmitting a request to a processing server to join a targeted application server;
  - receiving a virtual internet protocol (VIP) address associated with a demultiplexer, a private IP address for the targeted application server, a port number, and a token from the processing server;
  - generating an ingress packet, wherein the ingress packet includes a routing and authentication header that includes the token and a message; and
  - transmitting the ingress packet to the VIP address associated with the demultiplexer based on the port number.

9. The client device of claim 8, wherein the demultiplexer authenticates the token and responsive to the token being valid, generates an encapsulated packet from the ingress packet that enables the targeted application server to communicate directly with the client device.

10. The client device of claim 9, wherein the operations further comprise:
- responsive to the demultiplexer confirming that the token is valid, receiving communications at the client device directly from the targeted application server.

11. The client device of claim 8, wherein the demultiplexer authenticates the token and the operations further comprise:
- responsive to the demultiplexer determining that the token is invalid, receiving a notification from the demultiplexer that the token is invalid.

12. The client device of claim 8, wherein the ingress packet includes an extensible custom application-layer header.

13. The client device of claim 8, wherein the token is generated from a hash of an IP address for the client device, the private IP address for the targeted application server, and a secret key.

14. The client device of claim 8, wherein the ingress packet includes a user datagram protocol (UDP) header.

15. A non-transitory computer-readable medium with instructions stored thereon that, when executed by a processor of a client device, cause the processor to perform operations, the operations comprising:

transmitting a request to a processing server to join a targeted application server;

receiving a virtual internet protocol (VIP) address associated with a demultiplexer, a private IP address for the targeted application server, a port number, and a token from the processing server;

generating an ingress packet, wherein the ingress packet includes a routing and authentication header that includes the token and a message; and transmitting the ingress packet to the VIP address associated with the demultiplexer based on the port number.

16. The non-transitory computer-readable medium of claim 15, wherein the demultiplexer authenticates the token and responsive to the token being valid, generates an encapsulated packet from the ingress packet that enables the targeted application server to communicate directly with the client device.

17. The non-transitory computer-readable medium of claim 16, wherein the operations further comprise:

responsive to the demultiplexer confirming that the token is valid, receiving communications at the client device directly from the targeted application server.

18. The non-transitory computer-readable medium of claim 15, wherein the demultiplexer authenticates the token and the operations further comprise:

responsive to the demultiplexer determining that the token is invalid, receiving a notification from the demultiplexer that the token is invalid.

19. The non-transitory computer-readable medium of claim 15, wherein the ingress packet includes an extensible custom application-layer header.

20. The non-transitory computer-readable medium of claim 15, wherein the token is generated from a hash of an IP address for the client device, the private IP address for the targeted application server, and a secret key.

* * * * *